United States Patent
Auvergne et al.

(10) Patent No.: US 11,810,695 B2
(45) Date of Patent: Nov. 7, 2023

(54) CABLE COMPRISING A FIRE-RESISTANT CERAMIC LAYER

(71) Applicant: NEXANS, Courbevoie (FR)

(72) Inventors: Maxime Auvergne, Saint Etienne (FR); Franck Gyppaz, Lyons (FR)

(73) Assignee: NEXANS, Courbevoie (FR)

( * ) Notice: Subject to any disclaimer, the term of this patent is extended or adjusted under 35 U.S.C. 154(b) by 653 days.

(21) Appl. No.: 16/924,929

(22) Filed: Jul. 9, 2020

(65) Prior Publication Data

US 2021/0035710 A1 Feb. 4, 2021

(30) Foreign Application Priority Data

Jul. 12, 2019 (FR) ..................... 19 07864

(51) Int. Cl.
| | | |
|---|---|---|
| *C04B 35/18* | (2006.01) | |
| *C04B 35/622* | (2006.01) | |
| *C04B 35/64* | (2006.01) | |
| *H01B 7/295* | (2006.01) | |
| *H01B 13/00* | (2006.01) | |
| *H01B 13/16* | (2006.01) | |

(52) U.S. Cl.
CPC ............. *H01B 7/295* (2013.01); *C04B 35/18* (2013.01); *C04B 35/62222* (2013.01); *C04B 35/64* (2013.01); *H01B 13/0016* (2013.01); *H01B 13/16* (2013.01); *C04B 2235/3463* (2013.01)

(58) Field of Classification Search
CPC ............. C04B 2235/3463; C04B 35/18; C04B 35/62222; C04B 35/64; C04B 35/622; H01B 3/105; H01B 3/12; H01B 7/295; H01B 13/0016; H01B 13/16; H01B 13/00
USPC ........................................ 174/110 R
See application file for complete search history.

(56) References Cited

U.S. PATENT DOCUMENTS

2007/0246240 A1 * 10/2007 Alexander ............ C04B 35/524
 252/609
2009/0099289 A1 4/2009 Alexander

FOREIGN PATENT DOCUMENTS

| CN | 102220008 A | * 10/2011 | ............... C08K 3/16 |
| EP | 1172827 A1 | * 1/2002 | ............. H01B 3/441 |
| WO | 90/14671 | 11/1990 | |
| WO | 93/05520 | 3/1993 | |
| WO | 2016156627 | 10/2016 | |

OTHER PUBLICATIONS

Inherent Inorganic Elements from Google.*
Inherent Inorganic Elements from Google; Jun. 2023.*

* cited by examiner

*Primary Examiner* — Timothy J Thompson
*Assistant Examiner* — Guillermo J Egoavil
(74) *Attorney, Agent, or Firm* — Sofer & Haroun, LLP

(57) ABSTRACT

A cable, in particular a power and/or telecommunication cable, has at least one elongated electrically conductive element, and at least one fire-resistant layer surrounding said elongated electrically conductive element. The fire-resistant layer is a ceramic layer in direct physical contact with the elongated electrically conductive element.

18 Claims, No Drawings

CABLE COMPRISING A FIRE-RESISTANT CERAMIC LAYER

RELATED APPLICATION

This application claims the benefit of priority from French Patent Application No. 19 07864, filed on Jul. 12, 2019, the entirety of which is incorporated by reference.

BACKGROUND

Field of Invention

The present invention relates to a cable, in particular a power and/or telecommunication cable, comprising at least one elongated electrically conductive element, and at least one fire-resistant layer surrounding said elongated electrically conductive element, said fire-resistant layer being a ceramic layer in direct physical contact with said elongated electrically conductive element, a process for preparing such a cable, a liquid ceramic composition for said cable, and the use of said liquid ceramic composition for improving fire resistance.

It typically, but not exclusively, applies to fire-resistant safety cables, in particular halogen-free cables, which can operate for a given period of time under fire conditions without being fire propagators or generators of significant smoke. These safety cables are in particular power transmission cables or low-frequency transmission cables such as control or signal cables.

A power and/or telecommunication cable is a cable designed for the transport of power and/or the transmission of data. It may comprise one or more elongated electrically conductive elements, and optionally one or more elongated optically conductive elements, one or more electrically insulating layer(s), and a protective outer sheath designed to mechanically protect the underlying elements of said cable.

The materials that may be used to improve the fire resistance of one of the layers or of the protective sheath of said cable are composite materials based on polymers, in particular silicone polymers, and flame-retardant fillers. Despite the presence of such fillers, the fire resistance is not always fully satisfactory.

International application WO2017/199060 discloses a fire-resistant cable comprising an elongated conductive element surrounded by a ceramifiable layer of a ceramifiable composition comprising a mixture of thermoplastic polymers comprising (a) a copolymer of ethylene and an alpha-olefin having a density of 0.860 to 0.910 g/cm$^3$, a melt flow rate (MFR) not higher than 3 g/10 minutes and a melting point not higher than 105° C., (b) an ethylene homopolymer or a copolymer of ethylene and an alpha-olefin having a density of 0.900 to 0.985 g/cm$^3$, a melt flow rate (MFR) not higher than 5 g/10 minutes and a melting point not higher than 110° C., and (c) a polyethylene substituted with a monomer having ethylenic unsaturation; at least 25% by weight of silica; a fluxing agent chosen from alkali metal oxides and precursors thereof; an inorganic hydroxide such as magnesium hydroxide, aluminium hydroxide or a mixture thereof; and at least 5% by weight of a stabilizing agent based on hydrated magnesium silicate. This ceramifiable layer may constitute the outer layer of the cable (outer sheath) or the filling material or 'bedding' between the insulated conductive elements and the outer sheath. When this ceramifiable layer is exposed to high temperatures such as those caused by fire, it reacts to form a fire-resistant ceramic layer. However, the ceramifiable layer has a significant space requirement and the fire resistance properties are not optimized.

OBJECTS AND SUMMARY

The purpose of the present invention is to provide a cable, in particular a power or telecommunication cable, with improved fire resistance, and preferably with reduced dimensions.

The first object of the invention is a cable comprising at least one elongated electrically conductive element, and at least one fire-resistant layer surrounding said elongated electrically conductive element, characterized in that said fire-resistant layer is a ceramic layer in direct physical contact with said elongated electrically conductive element, and said ceramic layer is obtained by heat treatment of a liquid ceramic composition.

By virtue of the ceramic layer of the cable of the invention in direct physical contact with said elongated electrically conductive element, said ceramic layer being obtained by heat treatment of a liquid ceramic composition, the cable has improved fire resistance and reduced dimensions. Furthermore, said cable may be used as a telecommunication cable. Finally, the cable of the invention has, at the end of its manufacture, all the properties to resist a fire or temperatures lower than those reached in the event of a fire, which is not the case for cables based on ceramifiable layer(s) which require a transformation of the ceramifiable layer into a ceramic layer during a fire to provide fire resistance.

The Ceramic Layer

In the present invention, the expression "in direct physical contact" means that no layer of any kind is interposed between said elongated electrically conductive element and said ceramic layer. In other words, the cable does not comprise intermediate layer(s), in particular a layer(s) comprising at least one polymer, positioned between said elongated electrically conductive element and said ceramic layer.

A "passivation" layer formed by oxidation, for example in air or by surface treatment of the elongated electrically conductive element, is not considered to be a layer interposed or positioned between said elongated electrically conductive element and said ceramic layer. In other words, the elongated electrically conductive element may comprise a passivation layer. For this reason, the ceramic layer may be in direct physical contact with the passivation layer of the elongated electrically conductive element.

The ceramic layer of the cable of the invention is a layer which is in the ceramic state. In other words, it is already in the form of a ceramic before any exposure to flames or fire. The ceramic layer of the cable of the invention is, in particular, intended to resist a fire.

The ceramic layer of the cable of the invention is obtained by heat treatment of a liquid ceramic composition.

The heat treatment of the liquid ceramic composition is preferably carried out at a temperature of at most 1100° C., particularly preferably of at most about 1050° C., more particularly preferably of at most about 1000° C., and even more particularly preferably of at most about 950° C.

The heat treatment of the liquid ceramic composition may be carried out at a temperature of at least about 700° C., particularly preferably of at least about 750° C., and more particularly preferably of at least about 800° C.

According to a preferred embodiment of the invention, the ceramic layer is obtained by sintering of the liquid ceramic composition, i.e. by heat consolidation of the liquid ceramic composition. In other words, sintering is a process of heating the liquid ceramic composition without leading the solid ingredients to melting. Under the effect of heat, the grains weld together, forming the cohesion of the ceramic layer. Sintering can help to better control the densification of the liquid ceramic composition.

The ceramic layer is preferably obtained by conventional sintering, for example using a furnace.

In a particular embodiment, the ceramic layer is obtained by sintering the liquid ceramic composition at atmospheric pressure.

The ceramic layer of the cable of the invention may have a thickness ranging from about 5 to 30 μm, preferably from about 10 to 25 μm, and particularly preferably from about 15 to 20 μm.

The thickness of said fire-resistant layer has no significant impact on the cable diameter, which is a great advantage in terms of cable design.

The ceramic layer is preferably an inorganic layer. In other words, it comprises at least 80% by weight of inorganic component(s), preferably at least 90% by weight of inorganic component(s), particularly preferably at least 95% by weight of inorganic component(s), and particularly preferably the ceramic layer comprises only one or more inorganic component(s).

In the invention, the expression "inorganic component" means a component free of carbon-hydrogen bond(s), and/or the expression "inorganic component" means a component incorporating one or more metal atoms in its structure.

Said ceramic layer is preferably an electrically insulating layer.

According to the present invention, the expression "electrically insulating layer" means a layer whose electrical conductivity may be at most about $1.10^{-8}$ S/m (siemens per meter), preferably at most $1.10^{-9}$ S/m' and particularly preferably at most $1.10^{-10}$ S/m (siemens per meter), measured at 25° C. in direct current.

The layer being preferably an electrically insulating layer, it generally does not comprise particles of conductive metal in the zero oxidation state and/or conductive fillers.

The Liquid Ceramic Composition

The liquid ceramic composition is a liquid composition. In other words, the ceramic composition is a liquid composition at room temperature, for example at a temperature ranging from about 18 to 25° C.

The liquid ceramic composition comprises at least one ceramic material, preferably a ceramic material comprising at least silicon, aluminium and oxygen.

The ceramic material is preferably in the form of a powder.

The ceramic material may represent from about 30 to 60% by weight, and preferably from about 40 to 55% by weight, based on the total weight of the liquid ceramic composition.

The liquid ceramic composition preferably additionally comprises water. In other words, the liquid ceramic composition is preferably an aqueous composition.

Water may represent at least about 35% by weight, and preferably at least about 40% by weight, based on the total weight of the liquid ceramic composition. Such a minimum amount of water may facilitate the application of the liquid ceramic composition to the elongated electrically conductive element.

Water may represent at most about 70% by weight, and preferably at most about 60% by weight, based on the total weight of the liquid ceramic composition.

According to a preferred embodiment of the invention, the liquid ceramic composition has a viscosity ranging from $5 \times 10^{-5}$ to $7 \times 10^{-5}$ m²/s (50 to 70 centistokes), and particularly preferably ranging from $5.5 \times 10^{-5}$ to $6.5 \times 10^{-5}$ m²/s (55 to 65 centistokes), said viscosity being measured according to the Ford viscosity cup, preferably according to standard ASTM D1200.

The liquid ceramic composition may further comprise at least one plasticizer, and preferably at least one inorganic plasticizer. The plasticizer may increase the viscosity of the liquid ceramic composition.

The plasticizer may be bentonite, for example.

The plasticizer may represent from about 0.1 to about 5.0% by weight, preferably from about 0.6 to 2.0% by weight, and particularly preferably from about 1.0 to 1.8% by weight, based on the total weight of the liquid ceramic composition.

The plasticizer is preferably in the form of a powder in the liquid ceramic composition.

The liquid ceramic composition may further comprise at least one first anti-flocculation agent, and preferably at least one first inorganic anti-flocculation agent. The first anti-flocculation agent may improve the homogenization of said composition.

The first anti-flocculation agent may be chosen from inorganic salts such as sodium hexafluorosilicate, alkaline earth oxides such as magnesium oxide, and mixtures thereof.

Among magnesium oxides, light calcined magnesia is particularly preferred. Indeed, it can allow a better reactivity.

The first anti-flocculation agent (or the first anti-flocculation agents if there are several) may represent from about 0.1 to 10.0% by weight, preferably from about 1.0 to 7.0% by weight, and particularly preferably from about 2.0 to 6.0% by weight, based on the total weight of the liquid ceramic composition.

The first anti-flocculation agent is preferably in the form of a powder in the liquid ceramic composition.

The liquid ceramic composition preferably comprises at most 5% by weight of organic polymer(s), more preferably at most 1% by weight of organic polymer(s), and even more preferably does not comprise organic polymer(s), based on the total weight of the liquid ceramic composition.

According to a particular preferred embodiment, the liquid ceramic composition is an inorganic ceramic composition, the term "inorganic" being as defined in the invention.

Ceramic Material

In an embodiment of the invention, the ceramic material is obtained from a solid ceramifiable composition.

The ceramic material may be obtained by methods well known to the person skilled in the art, for example by heat treatment at a temperature of at least about 1000° C., preferably at a temperature of at least about 1100° C., and particularly preferably at a temperature of at least about 1150° C.

The heat treatment may be a melting process.

The solid ceramifiable composition preferably comprises at least one metal oxide.

The solid ceramifiable composition may comprise at least about 15% by weight of metal oxide(s), and preferably at least about 20% by weight of metal oxide(s), based on the total weight of said solid ceramifiable composition.

The solid ceramifiable composition may comprise at most about 55% by weight of metal oxide(s), and preferably at most about 50% by weight of metal oxide(s), based on the total weight of said solid ceramifiable composition.

The solid ceramifiable composition preferably comprises at least one silicon oxide and at least one aluminium oxide.

Aluminium oxide may represent from about 1 to 35% by weight, preferably from about 3 to 25% by weight, based on the total weight of the solid ceramifiable composition.

Silicon oxide may represent from about 10 to 40% by weight, and preferably from about 13 to 35% by weight, based on the total weight of the solid ceramifiable composition.

The solid ceramic composition may further comprise a fluxing agent, and preferably an inorganic fluxing agent. The fluxing agent may improve the formation of the ceramic material, in particular by lowering the melting temperature of the solid ceramifiable composition.

The fluxing agent may be chosen from dehydrated boric acid, a metal oxide such as lead oxide, zinc oxide, bismuth oxide, or lead bisilicate, and mixtures thereof.

The fluxing agent (or fluxing agents when there are several) may represent from about 20-50% by weight, based on the total weight of the solid ceramifiable composition.

The solid ceramifiable composition may further comprise a densifying agent, and preferably an inorganic densifying agent, such as titanium dioxide. The densifying agent may be used to reduce the porosity of the solid ceramifiable composition and the ceramic layer.

The densifying agent may represent from about 3 to 10% by weight, based on the total weight of the solid ceramifiable composition.

The solid ceramifiable composition may further comprise a binder, and preferably an inorganic binder, such as manganese dioxide. The binder may be used to obtain a homogeneous solid ceramifiable composition.

The binder may represent from about 0.2 to 2% by weight, based on the total weight of the solid ceramifiable composition.

The solid ceramifiable composition may further comprise a stabilizing agent, and preferably an inorganic stabilizing agent, such as a metal carbonate. Calcium carbonate is particularly preferred. The stabilizing agent may be used to obtain a stable solid ceramifiable composition.

The stabilizing agent may represent from about 5 to 15% by weight, based on the total weight of the solid ceramifiable composition.

The solid ceramifiable composition may further comprise at least one second anti-flocculation agent, and preferably at least one second inorganic anti-flocculation agent. The second anti-flocculation agent may improve the homogenization of the composition.

The second anti-flocculation agent may be chosen from inorganic salts such as sodium hexafluorosilicate, alkaline earth oxides such as magnesium oxide, and mixtures thereof.

Among magnesium oxides, light calcined magnesia is particularly preferred. Indeed, it can allow a better reactivity.

The second anti-flocculation agent (or the second anti-flocculation agents when there are several) may represent from about 0.5 to about 25% by weight, and preferably from about 5 to about 22% by weight, based on the total weight of the solid ceramic composition.

The Cable

The cable is preferably an electric cable.

The elongated electrically conductive element of the cable of the invention may have a melting temperature of at least about 900° C., preferably of at least about 950° C., particularly preferably of at least about 1000° C., and more particularly preferably of at least about 1050° C.

According to a preferred embodiment, the elongated electrically conductive element is made of copper or a copper alloy such as a copper-nickel alloy.

A cable conforming to the present invention may comprise a plurality of elongated electrically conductive elements. In this case, each of the elongated electrically conductive elements is individually surrounded by at least one fire-resistant layer as previously defined, each of said layers being in direct physical contact with each of said elongated electrically conductive elements.

Preferably, the cable comprises at least one twisted pair of elongated electrically conductive elements, each of the elongated electrically conductive elements being individually surrounded by at least one fire-resistant layer as defined above, each of said layers being in direct physical contact with each of said elongated electrically conductive elements. In other words, the cable is a local area network (LAN)-type telecommunications cable. By way of example, the cable may be a UTP, SFTP, etc., type cable.

According to a particularly preferred embodiment of the invention, the cable comprises a plurality of twisted pairs of elongated electrically conductive elements as defined above.

The elongated electrically conductive element(s) may have a cross-section ranging from about 0.002 to 1 mm$^2$, and preferably ranging from about 0.004 to 0.5 mm$^2$.

According to a particular and preferred embodiment of the present invention, the cable further comprises at least one polymer layer surrounding said fire-resistant layer.

Said polymer layer is preferably an electrically insulating layer.

According to a particularly preferred embodiment of the invention, the polymer layer comprises a polymeric material chosen from cross-linked and non-cross-linked polymers, polymers of the inorganic type and of the organic type.

The polymeric material may in particular be a homopolymer or a copolymer having thermoplastic and/or elastomeric properties.

The polymers of the inorganic type may be polyorganosiloxanes.

The polymers of the organic type may be polyolefins, polyurethanes, polyamides, polyesters, polyvinyls or halogenated polymers such as fluorinated polymers (e.g. polytetrafluoroethylene PTFE) or chlorinated polymers (e.g. polyvinyl chloride PVC).

The polyolefins may be chosen from polymers of ethylene and propylene. As examples of ethylene polymers, mention may be made of linear low-density polyethylenes (LLDPE), low-density polyethylenes (LDPE), medium-density polyethylenes (MDPE), high-density polyethylenes (HDPE), copolymers of ethylene and vinyl acetate (EVA), copolymers of ethylene and butyl acrylate (EBA), methyl acrylate (EMA), 2-hexylethyl acrylate (2HEA), copolymers of ethylene and alpha-olefins such as for example polyethyleneoctene (PEO), ethylene-propylene copolymers (EPR), ethylene-ethyl acrylate copolymers (EEA), or ethylene-propylene terpolymers (EPT) such as for example ethylene-propylene diene monomer (EPDM) terpolymers.

According to the present invention, the expression "low-density polyethylene" means a polyethylene having a density ranging from about 0.91 to 0.925, said density being measured according to standard ISO 1183A (at a temperature of 23° C.).

According to the present invention, the expression "medium-density polyethylene" means a polyethylene having a density ranging from about 0.926 to 0.940, said density being measured according to standard ISO 1183A (at a temperature of 23° C.).

According to the present invention, the expression "high-density polyethylene" means a polyethylene having a density ranging from about 0.941 to 0.965, said density being measured according to standard ISO 1183A (at a temperature of 23° C.).

The polymer layer is, preferably, a layer extruded by techniques well known to the skilled person.

When the cable comprises a plurality of elongated electrically conductive elements, each of the elongated electrically conductive elements being individually surrounded by at least one fire-resistant layer as defined above, each of said layers being in direct physical contact with each of said elongated electrically conductive elements, the polymer layer may surround the plurality of insulated elongated electrically conductive elements.

In another embodiment, the cable comprises a plurality of polymeric layers, each of the polymeric layers surrounding each of the insulated elongated electrically conductive elements.

The cable conforming to the present invention may further include a protective sheath. In this case, said protective sheath is preferably the outermost layer of said cable.

Advantageously, said protective sheath surrounds the polymer layer(s).

The outer protective sheath is preferably made of halogen-free material. It may be conventionally made from flame retardant or flame resistant materials. In particular, if the latter do not contain halogen, they are referred to as halogen-free flame retardant (HFFR) type sheathing.

It comprises at least one organic or inorganic polymer.

The choice of the organic or inorganic polymer is not restrictive and these are well known to the person skilled in the art.

According to a preferred embodiment of the invention, the organic or inorganic polymer is chosen from cross-linked and non-cross-linked polymers.

The organic or inorganic polymer may be a homo- or co-polymer having thermoplastic and/or elastomeric properties.

The inorganic polymers may be polyorganosiloxanes.

The organic polymers may be polyurethanes or polyolefins identical to those defined above for the electrically insulating polymer layer.

The polymer of said sheath is preferably an organic polymer, more preferably an ethylene polymer, and more preferably an ethylene-vinyl acetate copolymer, a linear low-density polyethylene or a mixture thereof.

The protective outer sheath may further comprise a hydrated flame-retardant mineral filler. This hydrated flame-retardant mineral filler acts mainly by physical means by decomposing endothermically (e.g. releasing water), which lowers the temperature of the sheath and limits the spread of flames along the cable. These are commonly known as flame retardant properties.

The hydrated flame-retardant mineral filler may be a metal hydroxide such as magnesium hydroxide or aluminium trihydroxide.

The outer protective sheath may further comprise an inert filler, in particular chosen from talc, mica, chalk, dehydrated clays, and mixtures thereof.

Process for Manufacturing the Cable

The second object of the invention is a process for manufacturing a cable conforming to the first object of the invention, characterized in that it comprises at least the following steps:

i) applying the liquid ceramic composition directly around at least one elongated electrically conductive element of the cable, and ii) heat treating the liquid ceramic composition to obtain the ceramic layer.

The liquid ceramic composition is as defined in the first object of the invention.

The process may further comprise, prior to step i), a step i0) of preparing the liquid ceramic composition.

Step i0)

According to a preferred embodiment of the invention, step i0) comprises the following sub-steps:
preparing the ceramic material from the solid ceramifiable composition, and
mixing the ceramic material with water, the plasticizer, and the first anti-flocculation agent.

Preferably the ceramic material is prepared by mixing silicon oxide with aluminium oxide, and optionally with the fluxing agent, the second anti-flocculation agent, the stabilizing agent, the binder, and/or the densifying agent, to form the solid ceramifiable composition, and then by heat treatment of the solid ceramifiable composition.

The heat treatment is as defined in the first object of the invention. It makes it possible to obtain the ceramic material from the solid ceramifiable composition.

After heat treatment, the ceramic material thus obtained may be cooled to room temperature, preferably to form a solid mass.

The ceramic material in the form of a solid mass is preferably ground, in particular by means of a grinding jar comprising alumina balls. In this way a powder is formed.

The mixing of the ceramic material with water, the plasticizer, and the first anti-flocculation agent is usually done by mixing water, the plasticizer, and the first anti-flocculation agent, and then adding the ceramic material to the previous mixture.

Step (i)

Step i) is preferably carried out by coating, and particularly preferably by dipping, for example using a bath containing said liquid ceramic composition.

Step i) is preferably carried out under stirring. In this way the homogeneity of the liquid ceramic composition is maintained.

Step ii)

The heat treatment is as defined in the first object of the invention, and it makes it possible to obtain the ceramic layer from the liquid ceramic composition.

The heat treatment is preferably carried out using a furnace, preferably a tubular furnace.

Prior to step i), the elongated electrically conductive element(s) may be subjected to a surface treatment, preferably surface oxidation. This promotes the adhesion of the ceramic layer to the elongated electrically conductive element(s).

Surface oxidation may be carried out by acid treatment of the elongated electrically conductive elements, especially in the presence of an electric current.

The third object of the invention is a liquid ceramic composition, in particular for a cable conforming to the first object of the invention, characterized in that it comprises:
at least one ceramic material comprising aluminium, silicon and oxygen,
at least one first anti-flocculation agent,
at least one plasticizer, and
water.

The liquid ceramic composition, the first anti-flocculation agent, the plasticizer, water, and the ceramic material are as defined in the first object of the invention.

The liquid ceramic composition is in particular intended to be applied around at least one elongated electrically conductive element of the cable conforming to the first object of the invention.

The fourth object of the invention is the use of a liquid ceramic composition conforming to the third object of the invention, to improve the fire resistance of a power and/or telecommunication cable.

DETAILED DESCRIPTION

Example

A ceramic material in the form of a powder was prepared as follows:

300 g of silicon oxide was mixed with 100 g of aluminium oxide, 110 g of lead oxide and 440 g of dehydrated boric acid as fluxing agents, 220 g of magnesium oxide and 10 g of sodium hexafluorosilicate as second anti-flocculation agents, 90 g of titanium dioxide as a densifying agent, 140 g of calcium carbonate as a stabilizing agent, and 10 g of manganese dioxide as a binder, to form a solid ceramifiable composition.

The resulting solid ceramifiable composition was then heat treated at 1200° C. (melting process), poured into a glass mould and then cooled to room temperature to form a solid ceramic material. The solid ceramic material was ground to form a ceramic powder.

1000 g of the ceramic powder was then mixed with 1000 g of water, 30 g of bentonite as plasticizer, and 50 g of magnesium oxide and 30 g of sodium hexafluorosilicate as first anti-flocculation agents, to form a liquid ceramic composition.

An elongated electrically conductive copper element of 0.2 mm² cross-section was dipped in a bath comprising the liquid ceramic composition, and then the dipped elongated electrically conductive element was heat treated by sintering with a tubular furnace at a temperature of 850° C., in order to form a fire-resistant ceramic layer around the elongated electrically conductive element of the cable.

The ceramic layer thus formed meets the requirements of the following standards: NF C 32070 cat. CR1, EN 50200 (IEC 60331-2) 2h, and IEC 60331-11-23.

The invention claimed is:

1. A cable comprising:
   at least one elongated electrically conductive element; and
   at least one fire-resistant layer surrounding said elongated electrically conductive element,
   wherein said fire-resistant layer is a ceramic layer in direct physical contact with said elongated electrically conductive element, and said ceramic layer is obtained by heat treatment of a liquid ceramic composition, and
   wherein the solid ceramifiable composition comprises at least one silicon oxide and at least one aluminium oxide.

2. The cable according to claim 1, wherein the heat treatment is carried out at a temperature of at most 1100° C.

3. The cable according to claim 1, wherein the heat treatment is carried out at a temperature of at least 700° C.

4. The cable according to claim 1, wherein the ceramic layer is an inorganic layer.

5. The cable according to claim 1, wherein the liquid ceramic composition comprises at least one ceramic material.

6. The cable according to claim 5, wherein the liquid ceramic composition further comprises water.

7. The cable according to claim 5, wherein the liquid ceramic composition further comprises at least one plasticizer.

8. The cable according to claim 5, wherein the liquid ceramic composition further comprises at least one first anti-flocculation agent.

9. The cable according to claim 5, wherein the ceramic material is obtained from a solid ceramifiable composition comprising at least 15% by weight of metal oxide(s), based on the total weight of said solid ceramifiable composition.

10. The cable according to claim 1, wherein the liquid ceramic composition has a viscosity ranging from $5 \times 10^{-5}$ to $7 \times 10^{-5}$ m²/s (50 to 70 centistokes), said viscosity being measured according to the Ford viscosity cup.

11. The cable according to claim 1, wherein the elongated electrically conductive element has a melting temperature of at least 900° C.

12. The cable according to claim 1, wherein said cable further comprises at least one polymer layer surrounding the fire-resistant layer.

13. The cable according to claim 12, wherein the polymer layer is an electrically insulating layer.

14. A process for manufacturing a cable as defined in claim 1, wherein said process comprises at least the following steps:
   i) applying the liquid ceramic composition directly around at least one elongated electrically conductive element of the cable, and
   ii) heat treating the liquid ceramic composition to obtain the ceramic layer.

15. The process according to claim 14, wherein the heat treatment is carried out at a temperature of at most 1100° C. and at atmospheric pressure.

16. The process according to claim 14, wherein the method further comprises prior to step i), a step in which the elongated electrically conductive element is subjected to a surface treatment.

17. A liquid ceramic composition for a cable as defined in claim 1, wherein said composition comprises:
   at least one ceramic material comprising aluminium, silicon and oxygen,
   at least one first anti-flocculation agent,
   at least one plasticizer, and
   water.

18. A method for improving the fire resistance of a power and/or telecommunication cable, said method comprising the step of:
   applying said ceramic composition according to claim 17, to said power and/or telecommunication cable.

* * * * *